(12) United States Patent
Kaminski et al.

(10) Patent No.: US 6,885,120 B2
(45) Date of Patent: Apr. 26, 2005

(54) STRUCTURAL ENCLOSED ROTOR CONFIGURATION FOR ELECTRIC MACHINE

(75) Inventors: Christopher Anthony Kaminski, Schenectady, NY (US); Yu Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/617,831

(22) Filed: Jul. 14, 2003

(65) Prior Publication Data

US 2005/0012428 A1 Jan. 20, 2005

(51) Int. Cl.[7] .............................. H02K 1/32; H02K 1/24
(52) U.S. Cl. ........................ 310/85; 310/52; 310/179; 310/214; 310/262
(58) Field of Search ...................... 310/261, 10, 40 R, 310/52, 85, 179–180, 184–185, 214, 262

(56) References Cited

U.S. PATENT DOCUMENTS

| | | | |
|---|---|---|---|
| 3,189,769 A | 6/1965 | Willyoung | 310/52 |
| 3,679,920 A * | 7/1972 | MacNab et al. | 310/10 |
| 3,956,648 A | 5/1976 | Kirtley, Jr. et al. | 310/40 R |
| 4,091,301 A | 5/1978 | Blank | 310/270 |
| 4,146,809 A | 3/1979 | Rielly | 310/261 |
| 4,358,700 A | 11/1982 | Nottingham et al. | 310/262 |
| 5,168,186 A | 12/1992 | Yashiro | 310/47 |
| 5,986,380 A | 11/1999 | Kaminski et al. | 310/270 |
| 6,169,353 B1 * | 1/2001 | Driscoll et al. | 310/261 |
| 6,194,807 B1 | 2/2001 | Kaminski et al. | 310/270 |
| 6,239,527 B1 | 5/2001 | Kaminski et al. | 310/168 |
| 6,291,919 B1 * | 9/2001 | Ganti et al. | 310/261 |
| 6,313,561 B1 | 11/2001 | Nygard et al. | 310/261 |
| 6,495,942 B1 * | 12/2002 | Kaminski et al. | 310/262 |
| 6,509,664 B1 * | 1/2003 | Shah et al. | 310/181 |
| 6,680,549 B1 * | 1/2004 | Boardman et al. | 310/52 |
| 6,700,274 B1 * | 3/2004 | Gamble et al. | 310/179 |
| 6,703,733 B1 * | 3/2004 | Wang et al. | 310/85 |
| 6,759,781 B1 * | 7/2004 | Bushko et al. | 310/208 |

FOREIGN PATENT DOCUMENTS

| | | | | |
|---|---|---|---|---|
| EP | 1124304 A2 * | 8/2004 | | H02K/1/24 |
| JP | 63310367 A * | 12/1988 | | H02K/55/04 |

* cited by examiner

*Primary Examiner*—Burton Mullins
(74) *Attorney, Agent, or Firm*—Nixon & Vanderhye P.C.

(57) ABSTRACT

A rotor configuration for an electric machine includes a rotor shaft and a multi-pole rotor core secured to the rotor shaft. A plurality of field winding modules are respectively disposed over each pole of the multi-pole rotor core. An enclosure is disposed over the field winding modules for containing the field winding modules over the rotor core. A magnetic shield is disposed over the field winding modules between the field winding modules and the enclosure. The simplified construction reduces manufacturing time and costs.

13 Claims, 6 Drawing Sheets

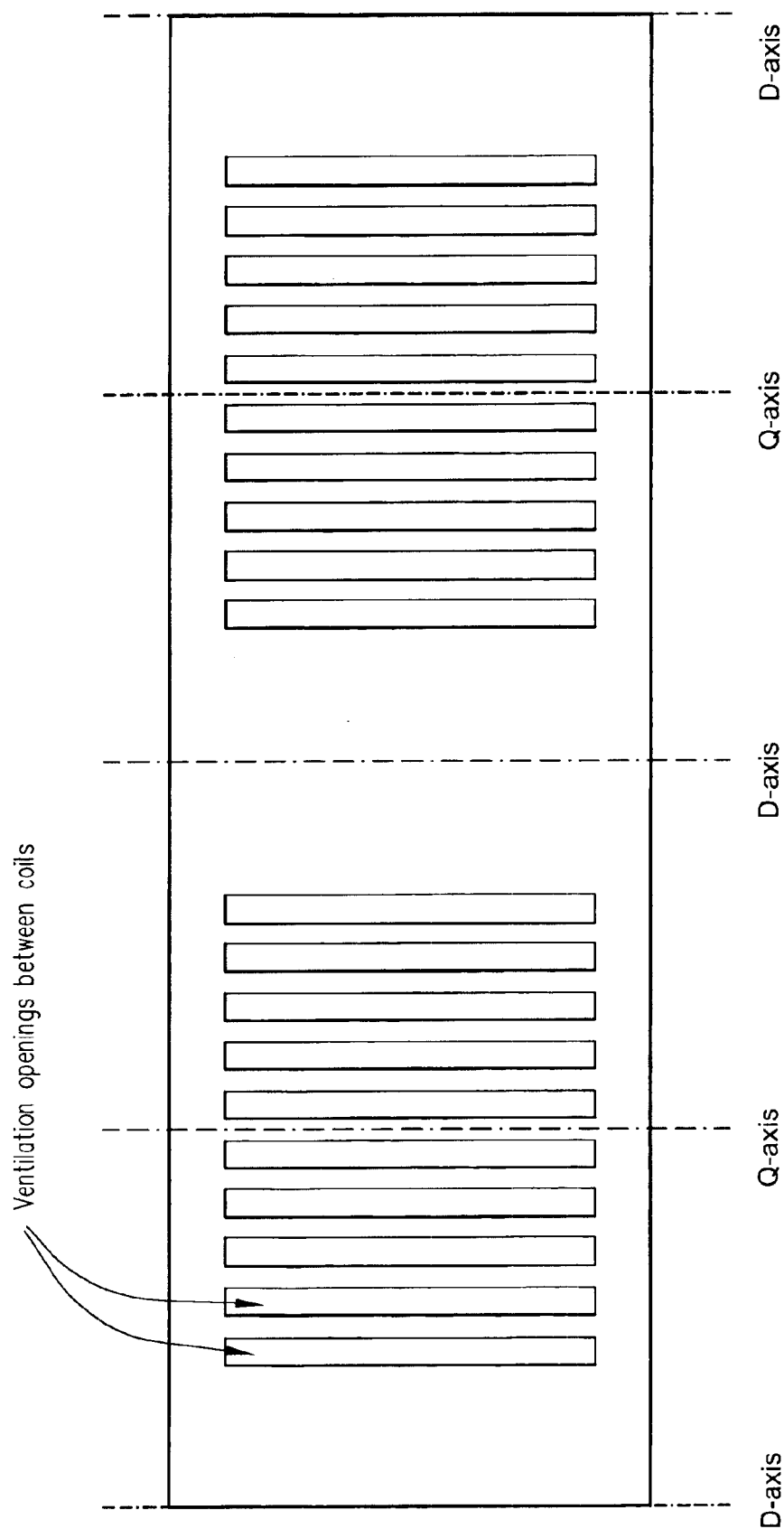
Fig.5 Single Piece Ventilated Shield

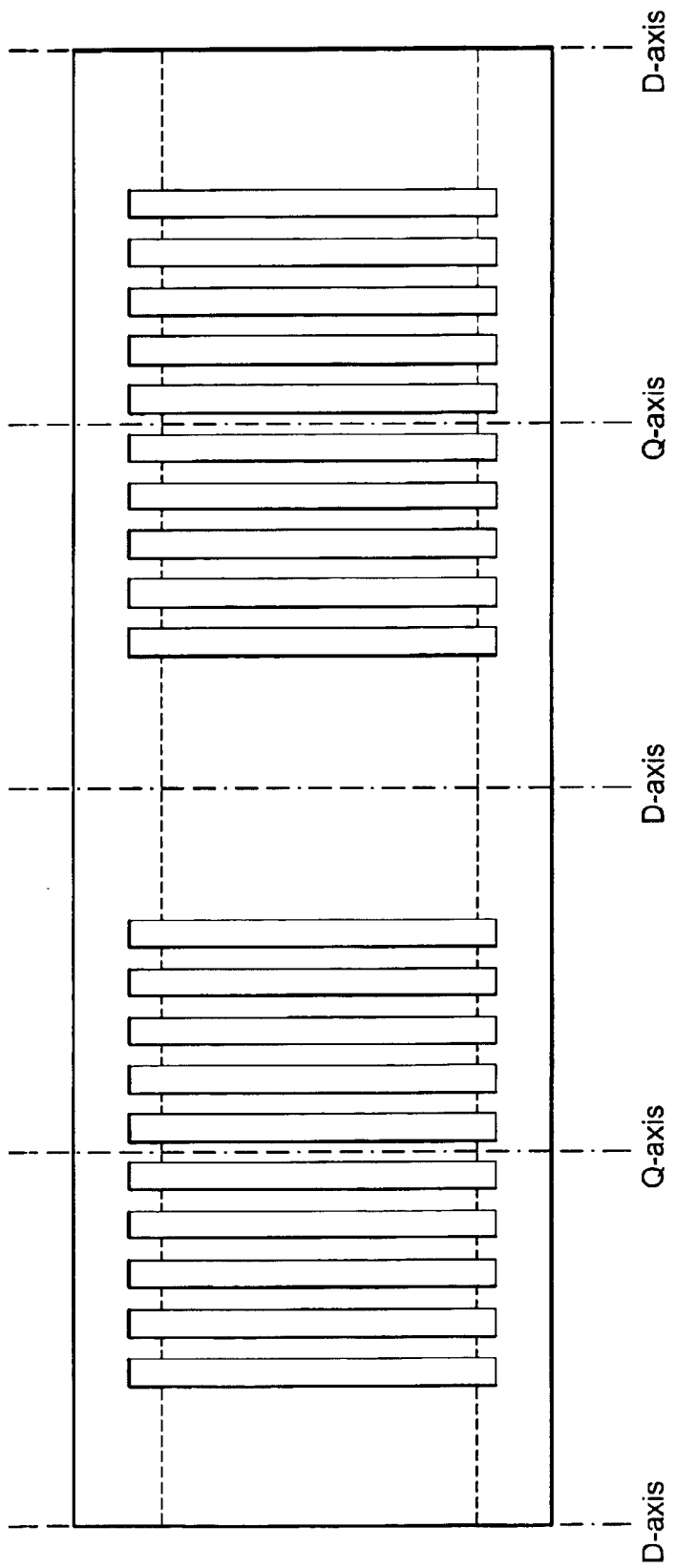
Fig.6 Multi-Piece Ventilated Shield
Fig.7

STRUCTURAL ENCLOSED ROTOR CONFIGURATION FOR ELECTRIC MACHINE

BACKGROUND OF THE INVENTION

The present invention relates to a rotor configuration for an electric machine and, more particularly, to a rotor configuration including a magnetic shield member disposed between field winding modules and a rotor enclosure.

In a conventional electric machine such as a generator having a rotor and a stator, the rotor is provided with field windings that excite the generator while receiving a current from an exciting current source. The stator is provided with armature windings from which electrical power is output. Typical rotor construction requires a field winding be assembled bar by bar, into radial slots milled into a rotor forging. Containment of the rotor field windings is typically achieved using rotor wedges, rotor teeth and retaining rings.

As rotor wedges, conventional generator fields use axial slotted forgings to wedge in the copper field winding turn by turn. As a result, the significant mass of copper is strongly coupled with the rotor shaft as an integral entity. The end winding is then typically enclosed by two thick metallic retaining rings, which are attached to the rotor body via shrink fit. The configuration provides strong support for huge centrifugal forces from field windings under high rotation speed and axial stiffness for steady rotor dynamics behavior.

The current configuration, however, defines the process by which the windings are assembled and how the rotor is machined. The rotor size, especially the diameter, is limited by the material strength of the shaft and retaining rings.

A simplified rotor enclosure is described in U.S. Pat. No. 6,495,942. This construction replaces conventional containment components with a simplified enclosure.

BRIEF DESCRIPTION OF THE INVENTION

In an exemplary embodiment of the invention, a rotor configuration for an electric machine includes a rotor shaft and a multi-pole rotor core secured to the rotor shaft. A plurality of field winding modules are respectively disposed over each pole of the multi-pole rotor core, and an enclosure is disposed over the field winding modules for containing the field winding modules over the rotor core. A magnetic shield is disposed over the field winding modules between the field winding modules and the enclosure.

In another exemplary embodiment of the invention, the rotor core is a two-pole rotor core, and a pair of field winding modules are respectively disposed over each pole of the two-pole rotor core. The enclosure includes an assembly of metallic or composite structural rings disposed over the field winding modules.

In still another exemplary embodiment of the invention, a method of assembling a rotor configuration for an electric machine includes securing a multi-pole rotor core to a rotor shaft; disposing a plurality of field winding modules over each pole of the multi-pole rotor core, respectively; containing the field winding modules over the rotor core with an enclosure; and placing a magnetic shield over the field winding modules between the field winding modules and the enclosure.

BRIEF DESCRIPTION OF THE DRAWINGS

FIG. 5 shows a single piece ventilated shield;

FIG. 6 shows a multi-piece ventilated shield; and

FIG. 7 is an end view of the multi-piece ventilated shield in FIG. 6 through a typical non-ventilated cross-section.

DETAILED DESCRIPTION OF THE INVENTION

Figure 1:
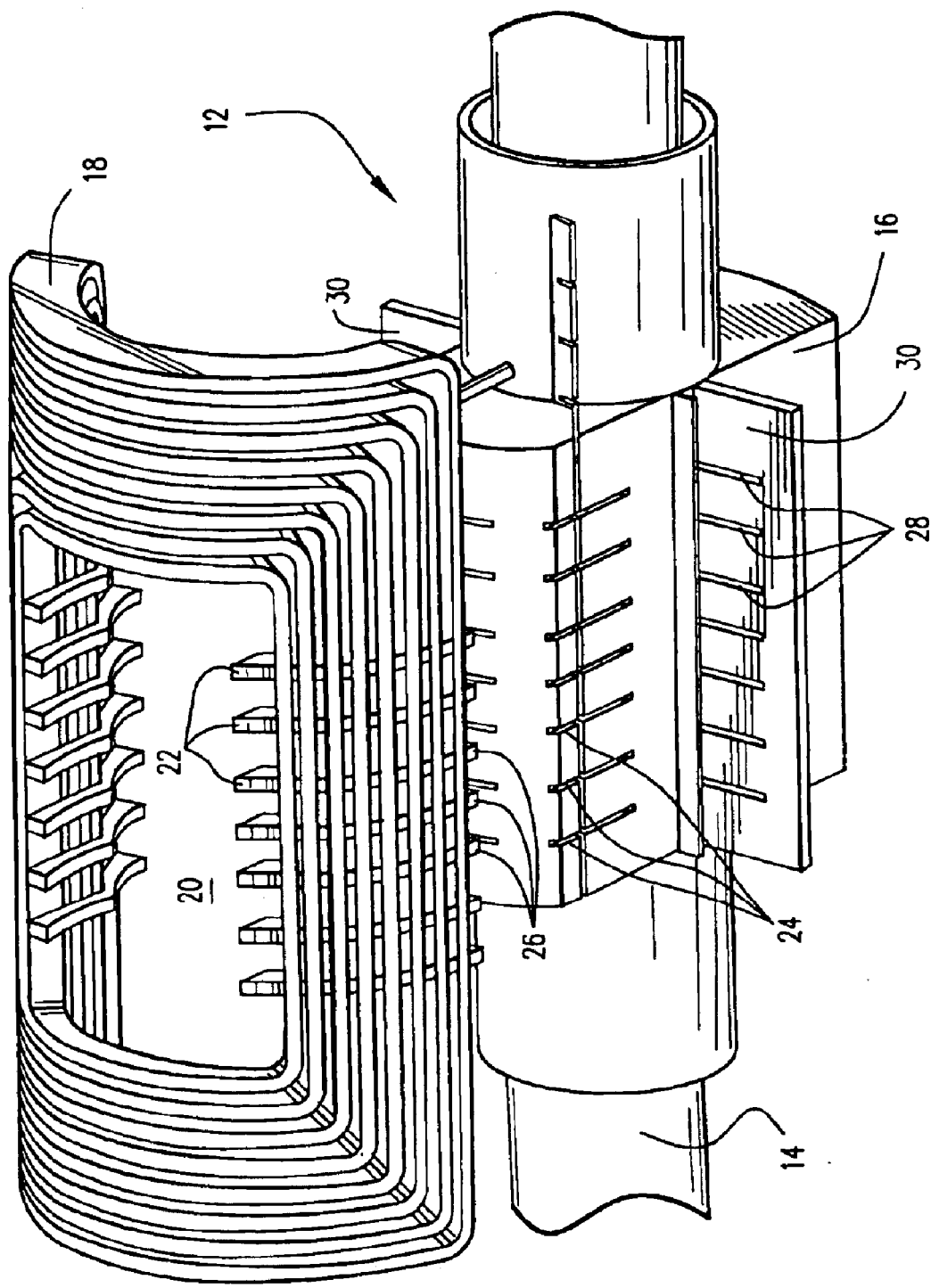
FIG. 1 is an assembly drawing of the rotor configuration of the present invention.
Figure 2:
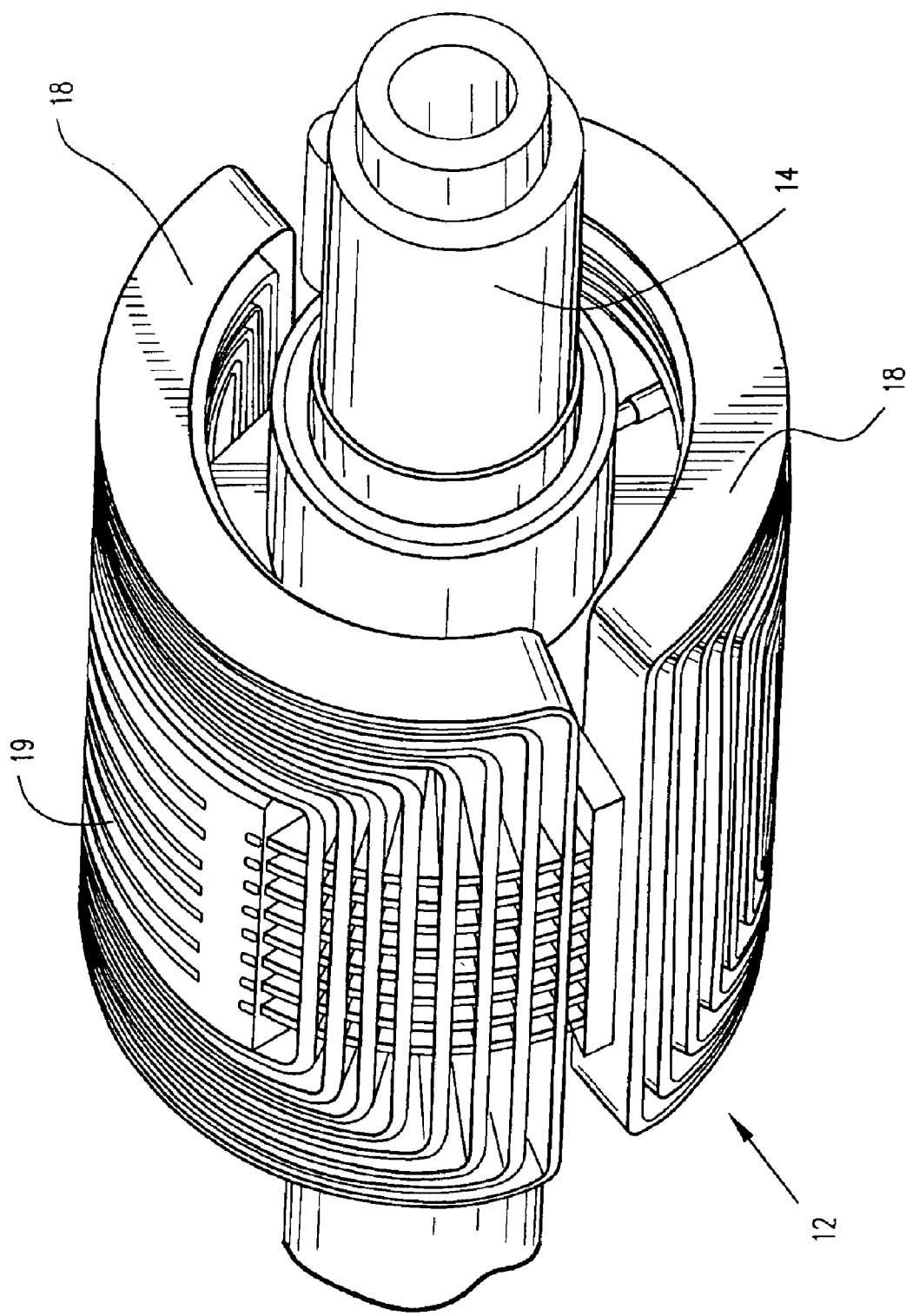
FIG. 2 is a perspective view showing the winding modules positioned over poles of the rotor core.
Figure 4:
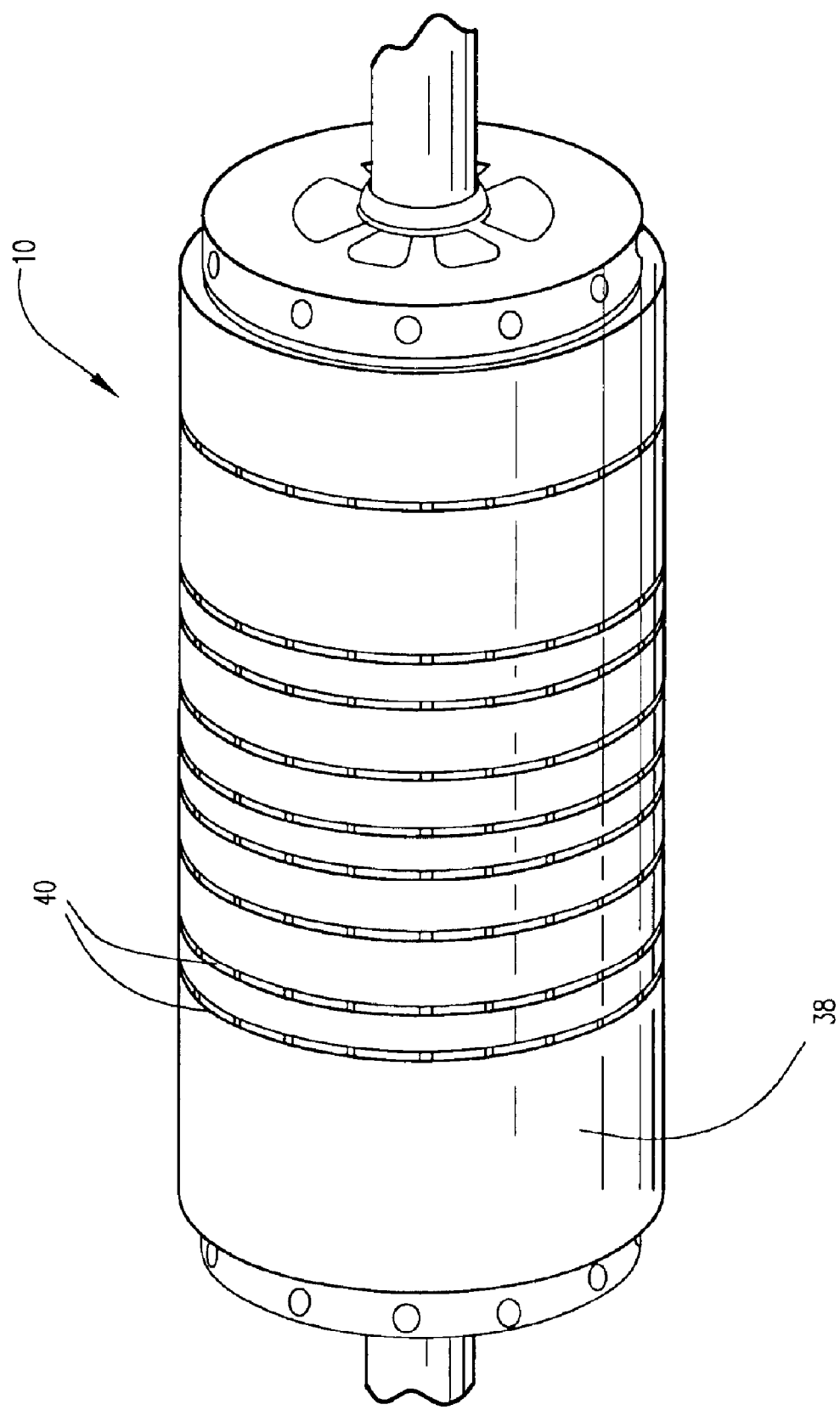
FIG. 4 shows the assembled rotor configuration.

An assembled rotor configuration 10 for an electric machine such as a generator or the like is shown in FIG. 4. With reference to FIGS. 1 and 2, the rotor configuration 10 includes a rotor assembly 12 having a rotor shaft 14 and a multi-pole magnetic rotor core 16 secured to the rotor shaft 14. A two-pole core 16 is shown in FIG. 1. A plurality of field winding modules 18 are respectively disposed over each pole of the multi-pole rotor core 16. Each of the winding modules 18 includes an opening 20 therein for receiving each pole of the rotor core 16 such that the pole faces 19 of the rotor core 16 are exposed.

Generally, the construction and materials of the magnetic core 16 and field winding modules 18 are known, and details thereof will not be further described. With continued reference to FIGS. 1 and 2, the field winding modules 18 are provided with projections 22 extending into the opening 20, which projections 22 engage corresponding notches 24 in the rotor core 16. Further projections 26 on a facing side of the field winding modules 18 are engageable with corresponding notches or grooves 28 formed in a field winding module support divider 30 disposed between poles of the rotor 16.

Figure 3:
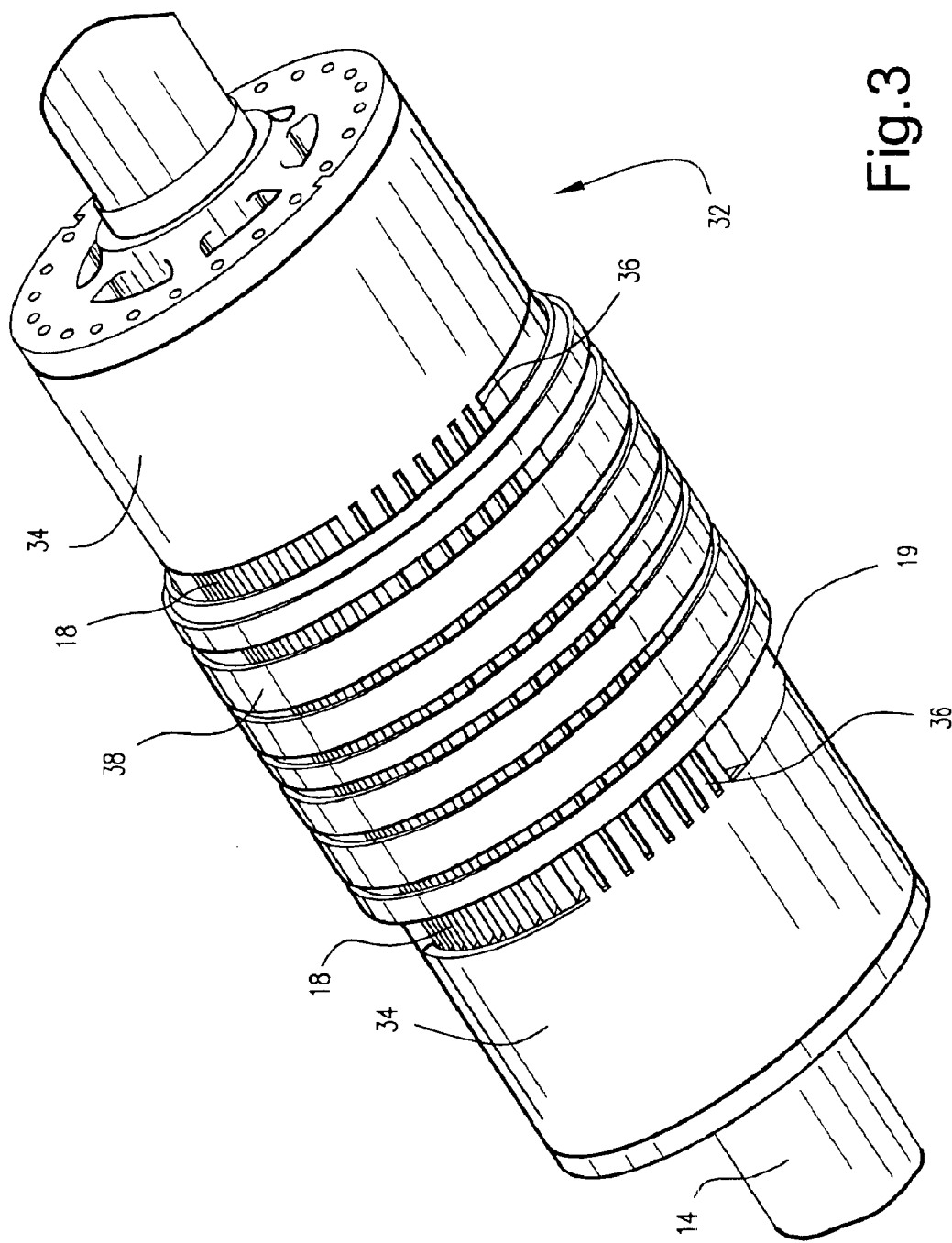
FIG. 3 shows the assembled rotor configuration including an enclosure that is partially cut away to show a magnetic shield.

After assembling the rotor assembly 12, with reference to FIG. 3, a magnetic shield 32 is disposed over the field winding modules 18. The shield 32 serves to protect the field winding modules 18 from currents and voltages induced by electromagnetic field harmonics. In one exemplary construction, the shield includes closed loop end circuits 34 disposed over ends of the field windings 18 and rotor assembly connected by axial members 36 in areas covering the windings of the field winding modules 18. Other shapes of the magnetic shield 32 may also be suitable provided the shield 32 effectively insulates the windings. For example, the shield may also be made of cylindrical tube or hoop-sectioned (with longitudinal cut) tube in a single piece (FIG. 5) or multiple pieces (FIGS. 6–7) along the longitudinal direction. Preferably, the magnetic shield member 32 is made of an electrically conductive material such as aluminum, copper or Condall.

With continued reference to FIG. 3 and with reference to FIG. 4, after assembling the rotor assembly 12 and securing the magnetic shield 32, an enclosure 38 is fitted over the field winding modules 18 and the magnetic shield 32 for containing the rotor components over the rotor core 16. The enclosure 38 may be formed of a one-piece tube shaped to fit over the multi-pole rotor core 16, the field winding modules 18, and the magnetic shield 32. Alternatively, the enclosure 38 may include an assembly of rings. Preferably, the enclosure 38 encloses the field winding modules 18 over an entire length of the rotor core 16. The enclosure 38 may be formed of any suitable material such as a metallic material or a composite material such as carbon fiber composite. In any construction, the enclosure 38 preferably includes ventilation openings or slots 40 providing discharge openings for winding ventilation without introducing stress concentrations in the enclosure 38.

The shield can be formed either by spin casting, or by means of a rolled forging process or an extrusion process with detailed dimensions and tolerances being obtained by means of additional machining. These processes are known and further details thereof will thus not be described.

With the rotor configuration of the invention, a simplified construction reduces manufacturing time and costs. A magnetic shield interposed between the enclosure and the field winding modules advantageously serves to insulate field windings.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A rotor configuration for an electric machine, the rotor configuration comprising:
   a rotor shaft;
   a multi-pole rotor core secured to the rotor shaft;
   a plurality of field winding modules comprising individual units respectively disposed over each pole of the multi-pole rotor core;
   an enclosure disposed over the field winding modules and containing the field winding modules over the rotor core; and
   a magnetic shield disposed over the field winding modules between the field winding modules and the enclosure, the magnetic shield comprising a single piece construction and including a plurality of longitudinally aligned ventilation slots.

2. A rotor configuration according to claim 1, wherein the enclosure comprises a one-piece tube shaped to fit over the multi-pole rotor core, the field winding modules, and the magnetic shield.

3. A rotor configuration according to claim 1, wherein the enclosure comprises an assembly of rings.

4. A rotor configuration according to claim 1, wherein the enclosure encloses the field winding modules over an entire length of the rotor core.

5. A rotor configuration according to claim 1, wherein the enclosure is formed of a metallic material.

6. A rotor configuration according to claim 1, wherein the enclosure is formed of a composite material.

7. A rotor configuration according to claim 1, wherein the magnetic shield comprises a one-piece tube shaped to fit over the multi-pole rotor core and the field winding modules.

8. A rotor configuration according to claim 1, wherein the magnetic shield is formed of an electrically conductive material.

9. A rotor configuration for an electric machine, the rotor configuration comprising:
   a rotor shaft;
   a two-pole rotor core secured to the rotor shaft;
   a pair of field winding modules comprising individual units respectively disposed over each pole of the two-pole rotor core;
   an enclosure including an assembly of metallic or composite structural rings disposed over the field winding modules and containing the field winding modules over a length of the rotor core; and
   a magnetic shield disposed over the field winding modules between the field winding modules and the enclosure, the magnetic shield comprising multiple overlapping segments aligned longitudinally relative to the rotor shaft.

10. A rotor configuration according to claim 9, wherein the magnetic shield comprises an assembly of discontinuous axial hoop members connected by closed loop end circuits.

11. A rotor configuration according to claim 9, wherein the magnetic shield is formed of an electrically conductive material.

12. A rotor configuration according to claim 9, wherein the magnetic shield comprises a plurality of longitudinally aligned ventilation slots.

13. A method of assembling a rotor configuration for an electric machine, the method comprising:
   securing a multi-pole rotor core to a rotor shaft;
   disposing a plurality of field winding modules as individual units over each pole of the multi-pole rotor core, respectively;
   containing the field winding modules over the rotor core with an enclosure;
   providing a magnetic shield with multiple overlapping segments aligned longitudinally relative to the rotor shaft; and
   placing the magnetic shield over the field winding modules between the field winding modules and the enclosure.

* * * * *